United States Patent [19]
Lunden

[11] Patent Number: 5,993,145
[45] Date of Patent: Nov. 30, 1999

[54] LUMBER STACKING APPARATUS WITH AUTOMATED STICKER FEEDING FEATURE

[76] Inventor: Sidney L. Lunden, 2415 S. Sunnybrook La., Veradale, Wash. 99037

[21] Appl. No.: 08/991,732

[22] Filed: Dec. 16, 1997

[51] Int. Cl.[6] .................................................. B65G 57/18
[52] U.S. Cl. ..................................... 414/789.5; 414/794.1; 414/794.3
[58] Field of Search ................................. 414/789.5, 794, 414/794.1, 794.3, 794.4

[56] References Cited

U.S. PATENT DOCUMENTS

| | | | |
|---|---|---|---|
| 1,225,523 | 5/1917 | Surles | 414/789.5 |
| 2,915,202 | 12/1959 | Aitken | 414/794.1 |
| 3,081,888 | 3/1963 | Lawson | 414/794.1 |
| 3,114,466 | 12/1963 | Willis | 414/789.5 |
| 3,437,215 | 4/1969 | Lunden | 214/6 |
| 3,737,052 | 6/1973 | Lunden | 214/6 |
| 3,737,053 | 6/1973 | Lunden | 214/6 |
| 3,743,113 | 7/1973 | Eaton et al. | 414/794.1 |
| 3,860,128 | 1/1975 | Lunden | 214/6 M |
| 3,904,044 | 9/1975 | Lunden | 214/6 M |
| 3,904,046 | 9/1975 | Lunden | 214/6 DK |
| 3,904,047 | 9/1975 | Lunden | 214/6 M |
| 3,968,886 | 7/1976 | Leon | 414/794.1 |
| 4,057,150 | 11/1977 | Lunden | 214/6 DK |
| 4,253,787 | 3/1981 | Lunden | 414/42 |
| 4,264,253 | 4/1981 | Kennison | 414/794.1 |
| 4,324,520 | 4/1982 | Kjellberg | 414/794.1 |
| 4,324,521 | 4/1982 | Lunden | 414/42 |
| 4,330,055 | 5/1982 | Lunden | 198/474 |
| 4,801,233 | 1/1989 | Ritola | 414/789.5 |
| 4,878,803 | 11/1989 | Whiddon | 414/789.5 |
| 5,350,272 | 9/1994 | Bowlin | 414/789.5 |
| 5,580,212 | 12/1996 | Andersson et al. | 414/789.5 |
| 5,720,592 | 2/1998 | Gillingham et al. | 414/789.5 |

*Primary Examiner*—Douglas Hess
*Attorney, Agent, or Firm*—David S. Thompson

[57] ABSTRACT

A lumber stacking apparatus 10 is described having a sticker feed conveyor 150 for distributing stickers to a plurality of sticker stations 154 adjacent a rear of the apparatus 10. A sticker transfer conveyor 158 is provided with grippers 186 at each sticker station 154 for gripping a rear end of the stickers and lifting the gripped stickers from the sticker feed conveyor 150 and moving the stickers forward and depositing the stickers in slots 62 formed in arms 54. The arms 54 are moved forward and upward to pick up a layer of boards on an elevated surface and to transfer the layer and underlying stickers to a layer stacking station 38. An overhead layer formation assembly 100 has layer formation stops 118 that selectively project downward into the path of the boards to form a layer and are removed to release a layer. A stripping mechanism 122 is associated with the layer formation assembly to strip the stickers and layer from the arms.

16 Claims, 16 Drawing Sheets

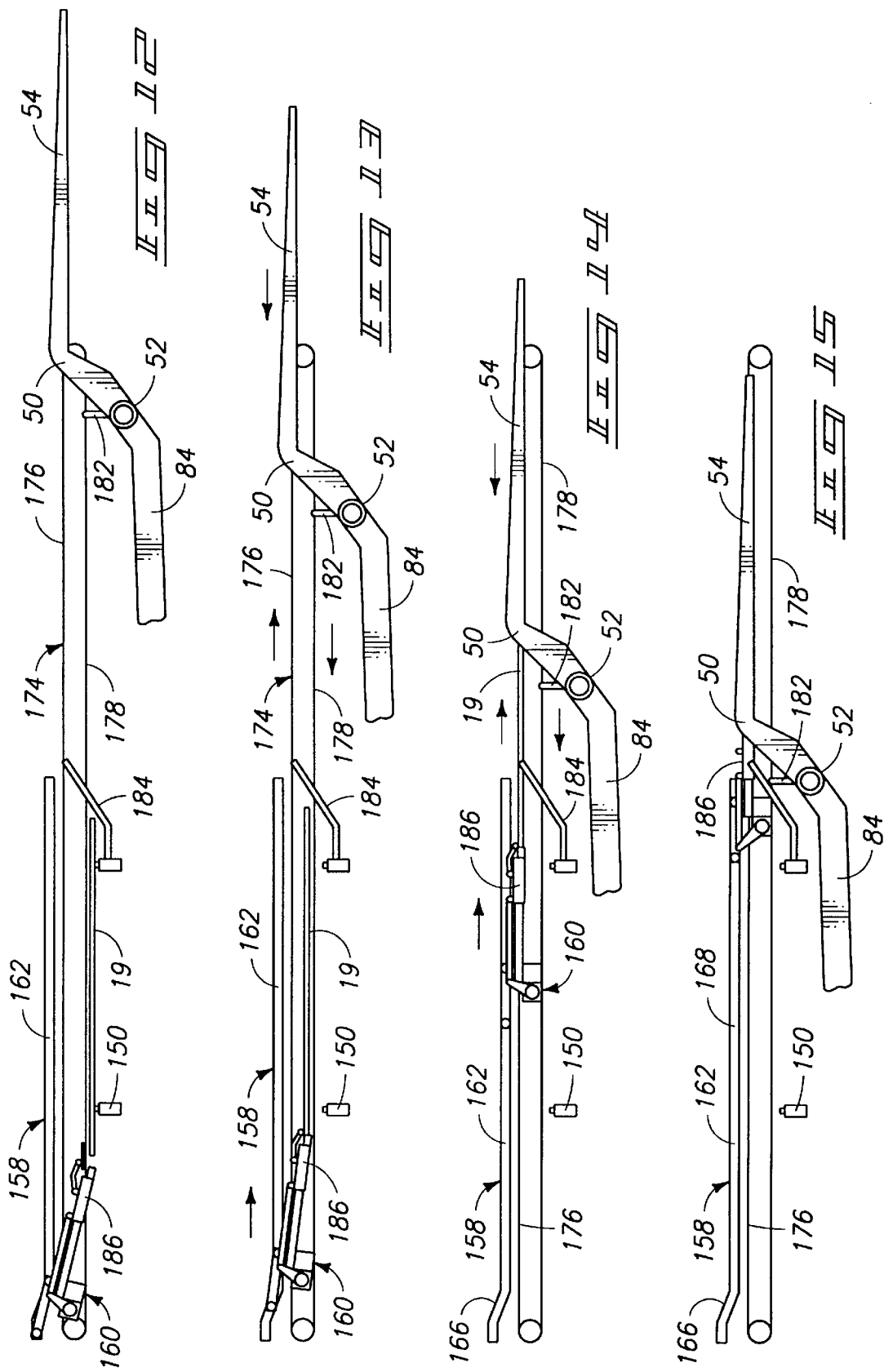

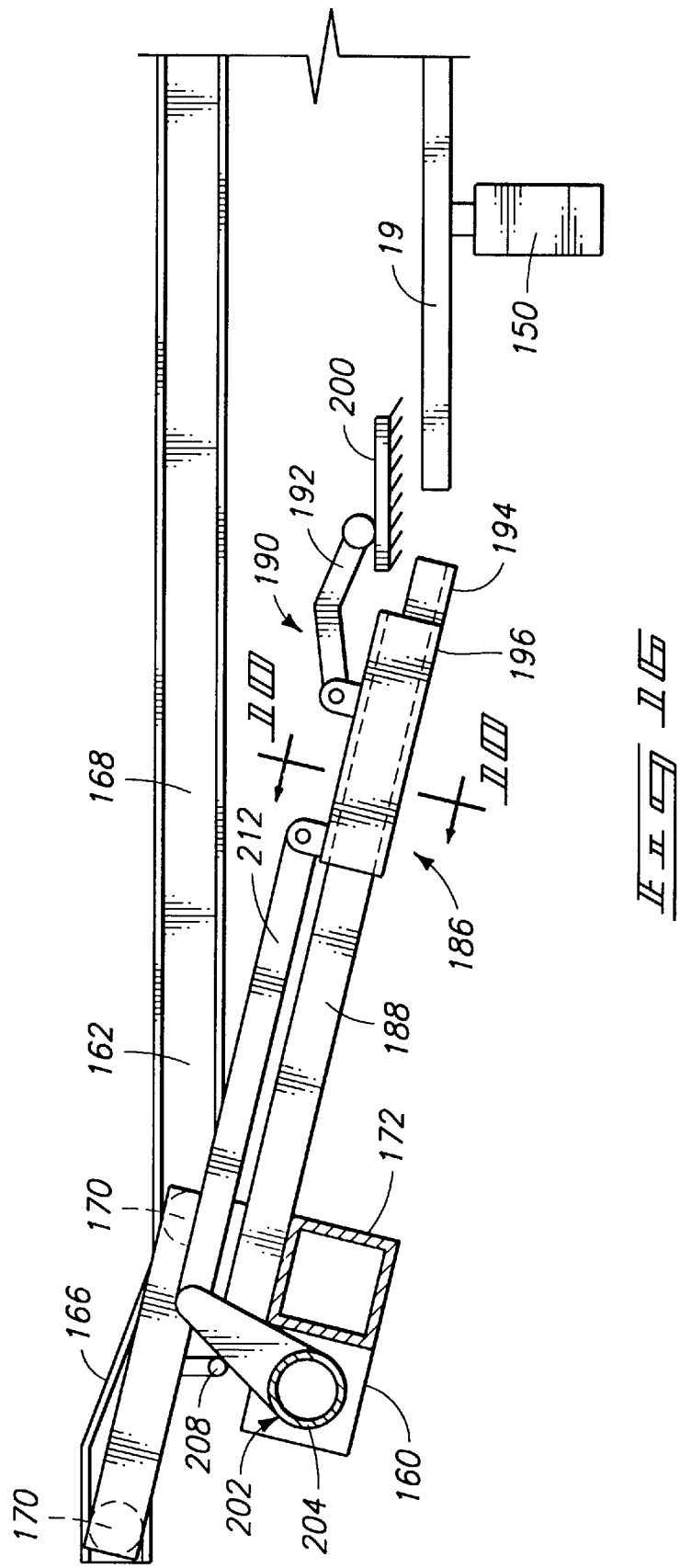

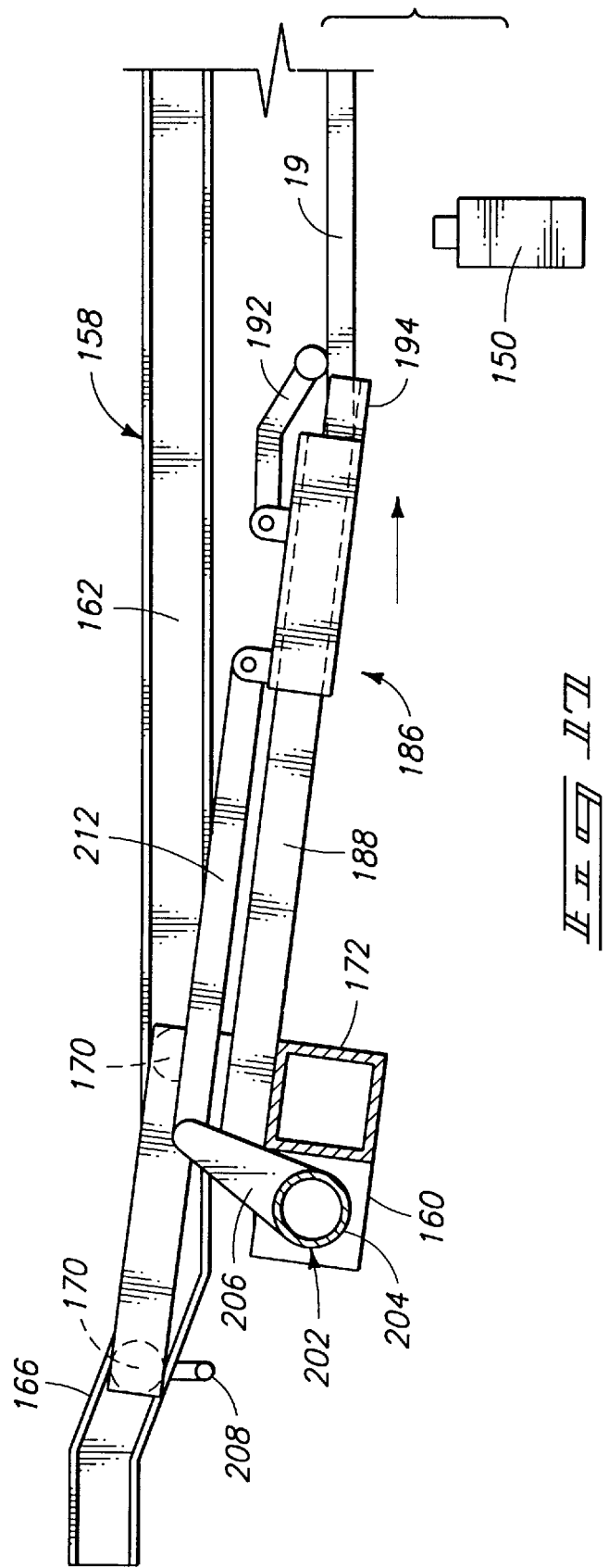

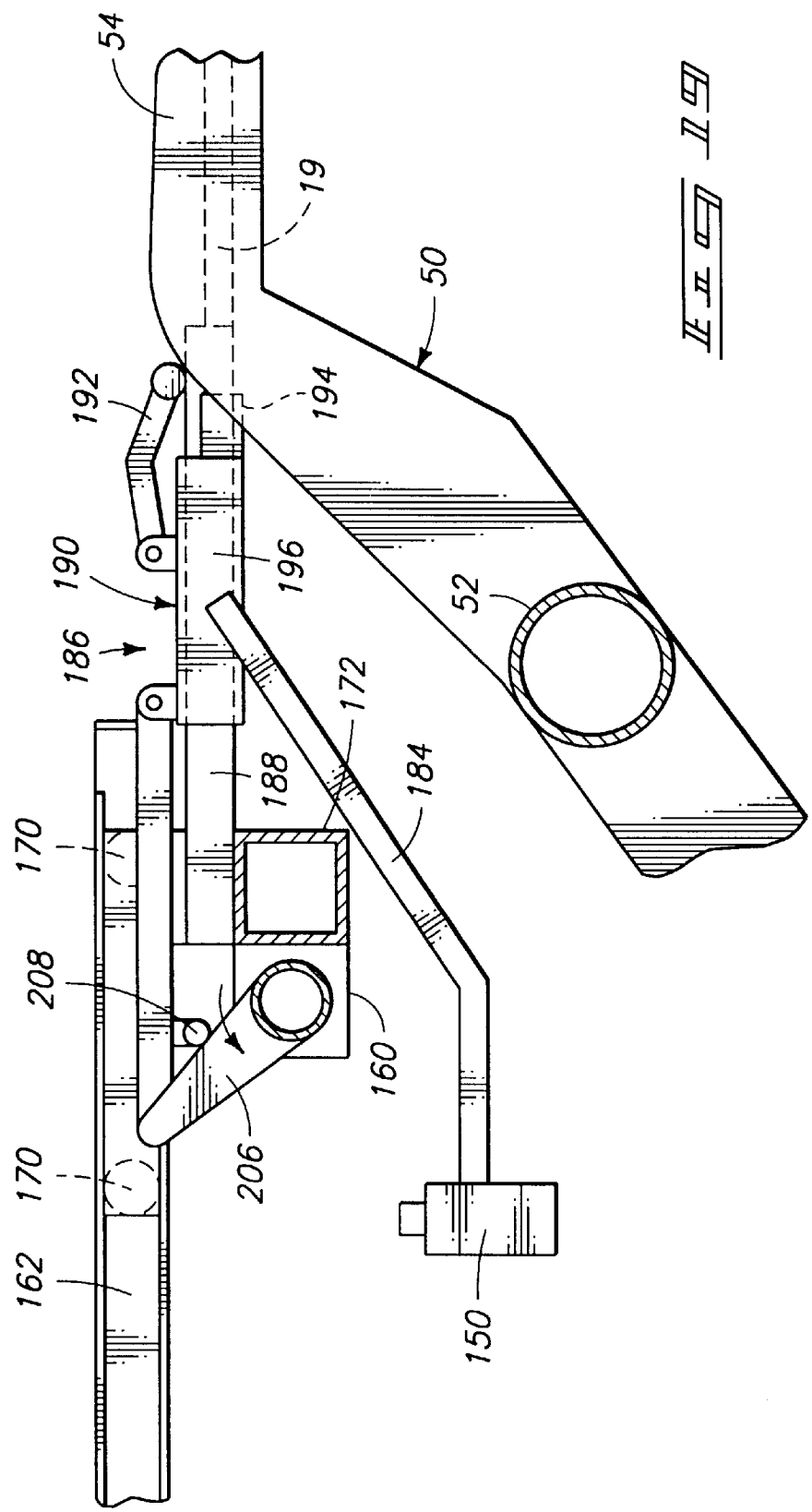

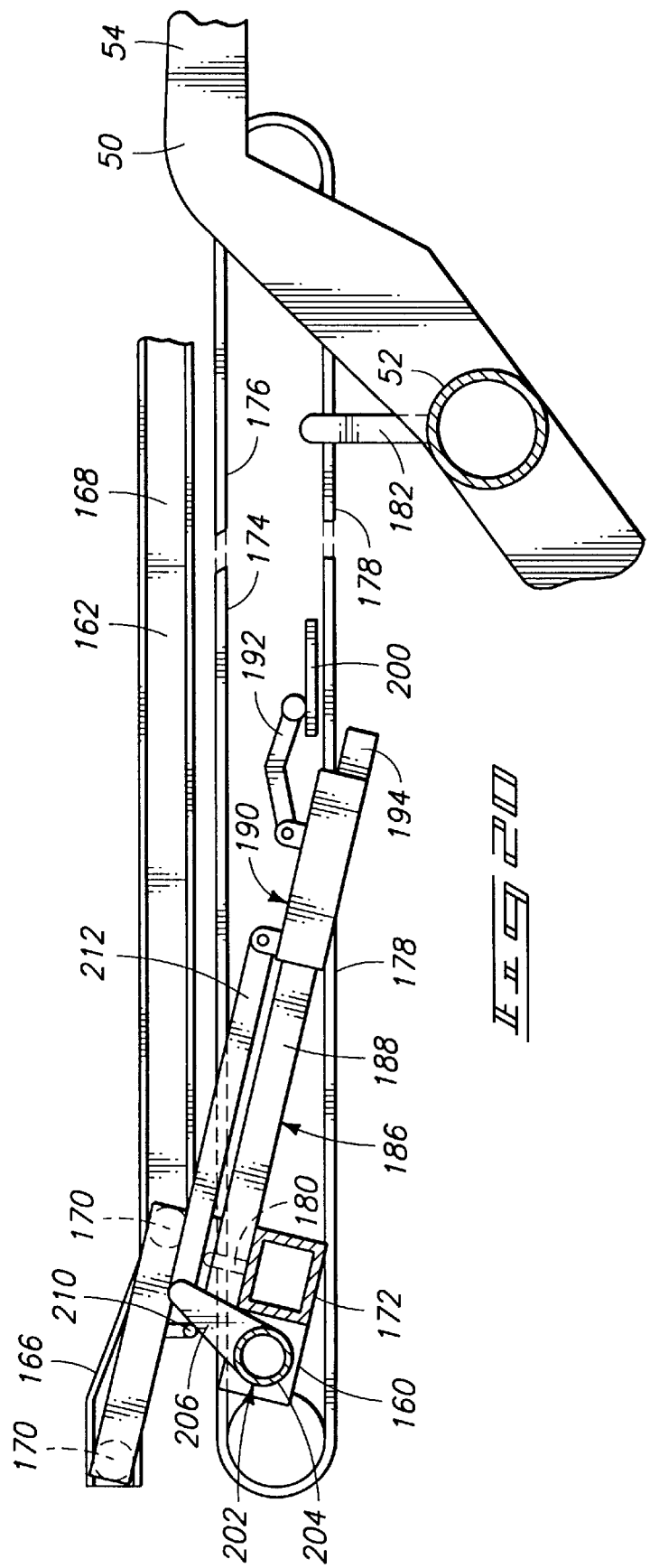

LUMBER STACKING APPARATUS WITH AUTOMATED STICKER FEEDING FEATURE

TECHNICAL FIELD

The present invention relates to a lumber stacking apparatus and more particularly to such stacking apparatus that automatically place stickers between courses of boards in a lumber stack.

BACKGROUND OF THE INVENTION

In the lumber industry, boards are freshly cut from logs and generally sorted and stacked for drying in a dry atmosphere such as a dry kiln. During the stacking operation elongated wooden slats called "stickers" are placed transversely between layers or courses at spaced intervals along the length of the stack. Usually, the stickers have lengths equal to the width of the stack and are positioned transverse to the boards in the stack. The stickers are placed at desired intervals along the stack to separate the layers and enable drying gases to circulate through the stack to uniformly dry the boards.

Over the years several attempts have been made to provide mechanized sticker placing equipment that is capable of automatically placing stickers between the courses as the stack is being formed.

One of the most commercially successful sticker placing equipment is based on the technology described in U.S. Pat. No. 3,904,044 granted to the applicant, Sidney L. Lunden, on Sep. 9, 1975. Such equipment is still being commercially used.

The present application is directed to a significant improvement which greatly simplifies the apparatus and increases the sticker placement reliability while reducing its cost of manufacture representing an additional good value for the customer.

BRIEF DESCRIPTION OF THE DRAWINGS

Preferred embodiments of the invention are described below with reference to the following accompanying drawings.

FIGS. 12–15 are a sequence of abbreviated vertical illustration views showing the movement of the sticker transfer conveyor in synchronous opposition to the movement of the arm structure; in which FIG. 12 shows the sticker transfer conveyor in its back position with a gripper preparing to pick up a sticker while the arm structure is in its most forward position; in which FIG. 13 shows the sticker transfer conveyor moving forward with the gripper picking up a rear end of a sticker while the arm structure is beginning to move rearward; in which FIG. 14 shows the sticker transfer conveyor moving forward sufficiently to push a sticker into the rear of the arm structure; and in which FIG. 15 shows the sticker transfer conveyor fully forward depositing the sticker in the arm structure when it is in its full rear position.

FIG. 16 is a fragmentary vertical cross-sectional view taken along line 16—16 in FIG. 7 showing a sticker gripper prior to picking up a sticker;

FIG. 17 is a fragmentary view similar to FIG. 16 except showing the sticker gripper picking up a sticker by its rear end;

FIG. 19 is a fragmentary view similar to FIG. 18 except showing the sticker gripper loading the sticker in a slot on an arm; and FIG. 20 is a fragmentary view similar to FIG. 16 except showing a continuous drive chain interconnection between the arm structure and the sticker transfer conveyor for moving the sticker transfer conveyor in synchronous opposition to the movement of the arm structure.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

In the lumber industry, stickers, generally designated with the numerals 19, are used to separate layers 16 of freshly cut boards 14 to enable the boards 14 to dry evenly to minimize warping, shrinkage and cracking. The stickers 19 are placed between selected board layers as the stack of layers is being formed.

Figure 1:
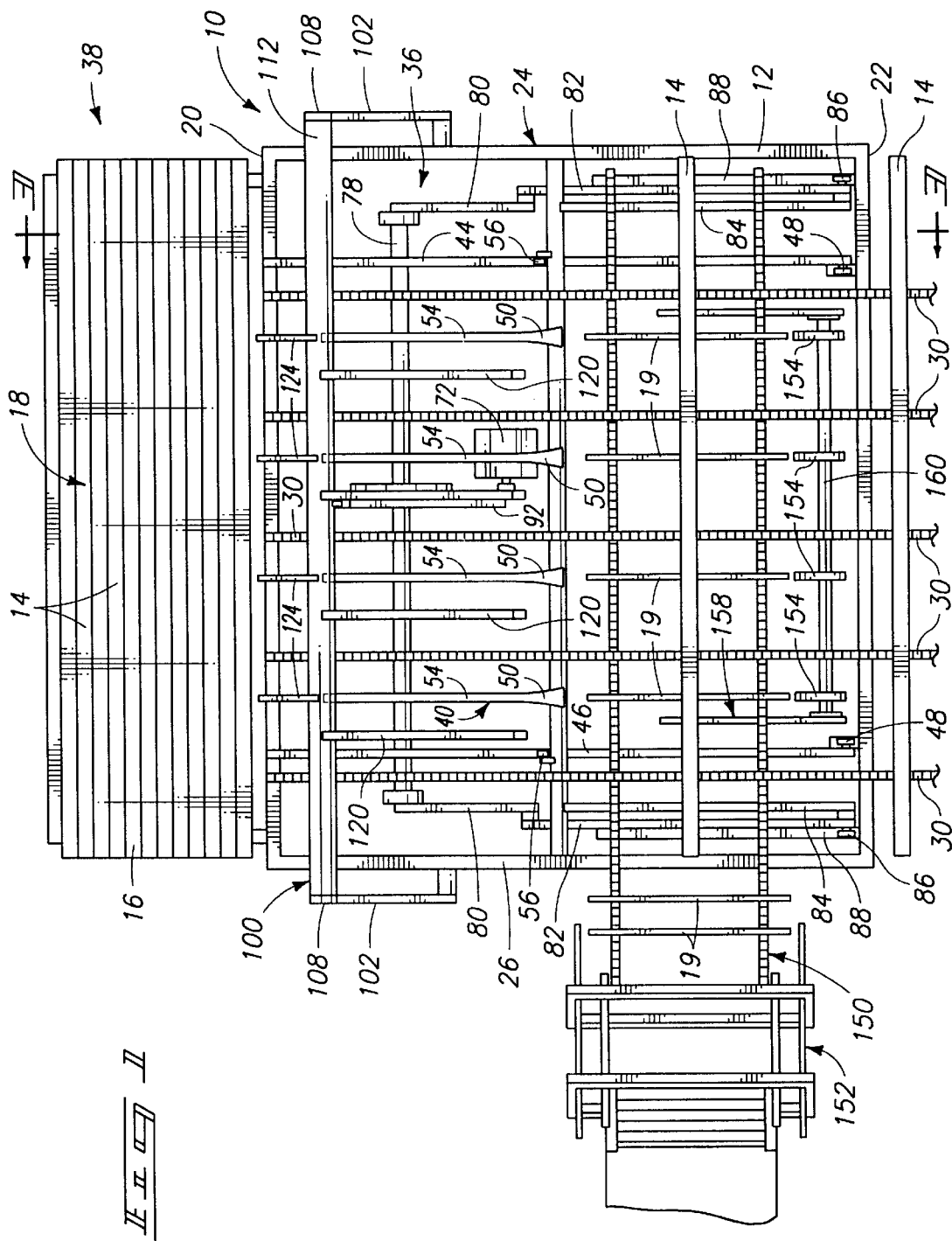
FIG. 1 is a plan view of a preferred embodiment of a lumber stacking apparatus of the present invention.

A preferred embodiment of an improved lumber stacking apparatus for automatically placing the stickers 19 between selected layers 16 as a stack 18 is being formed is illustrated in the accompanying drawings. The apparatus is generally designated with a numeral 10 and is generally shown in plan view in FIG. 1. The apparatus 10 has a general frame 12 facing the stack 18, in which the location of the stack defines a layer stacking station 38. The frame 12 has a front 20 adjacent the stack 18, a back 22 spaced or remote from the stack 18, and sides 24 and 26 that extend from the back 22 to the front 20.

The apparatus 10 includes a board conveyor 30 that conveys the boards 14 from a remote source onto an elevated layer support surface 32 at a layer pickup station 36 at the front 20 of the frame 12 and adjacent the layer stacking station 38. The board conveyor is conventional and will not be discussed or shown in any detail.

Figure 4:
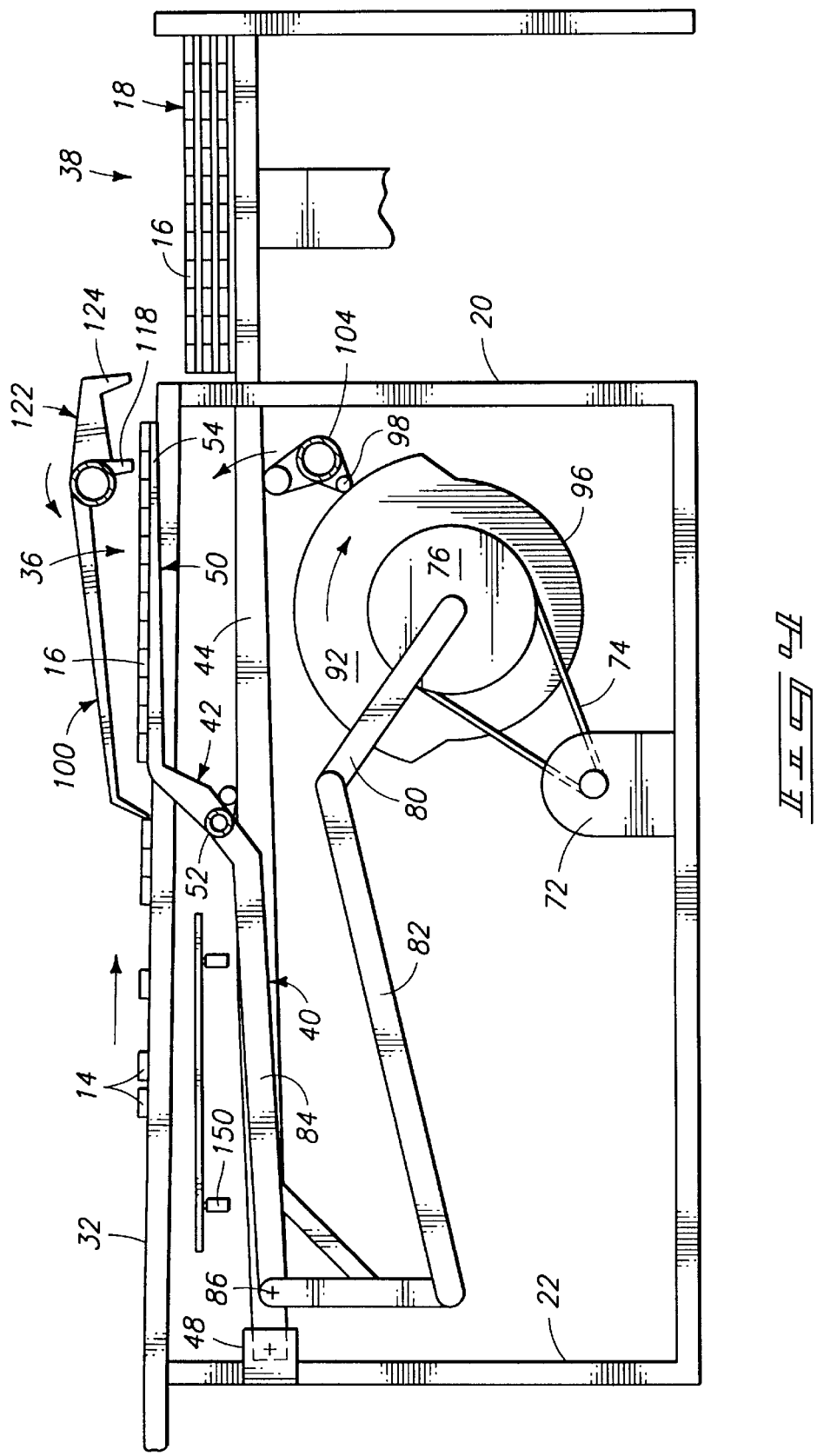
FIG. 4 is a vertical cross-sectional view similar to FIG. 3 except showing the arm structure moved partially forward and upward to lift the layer from the elevated support surface.
Figure 5:
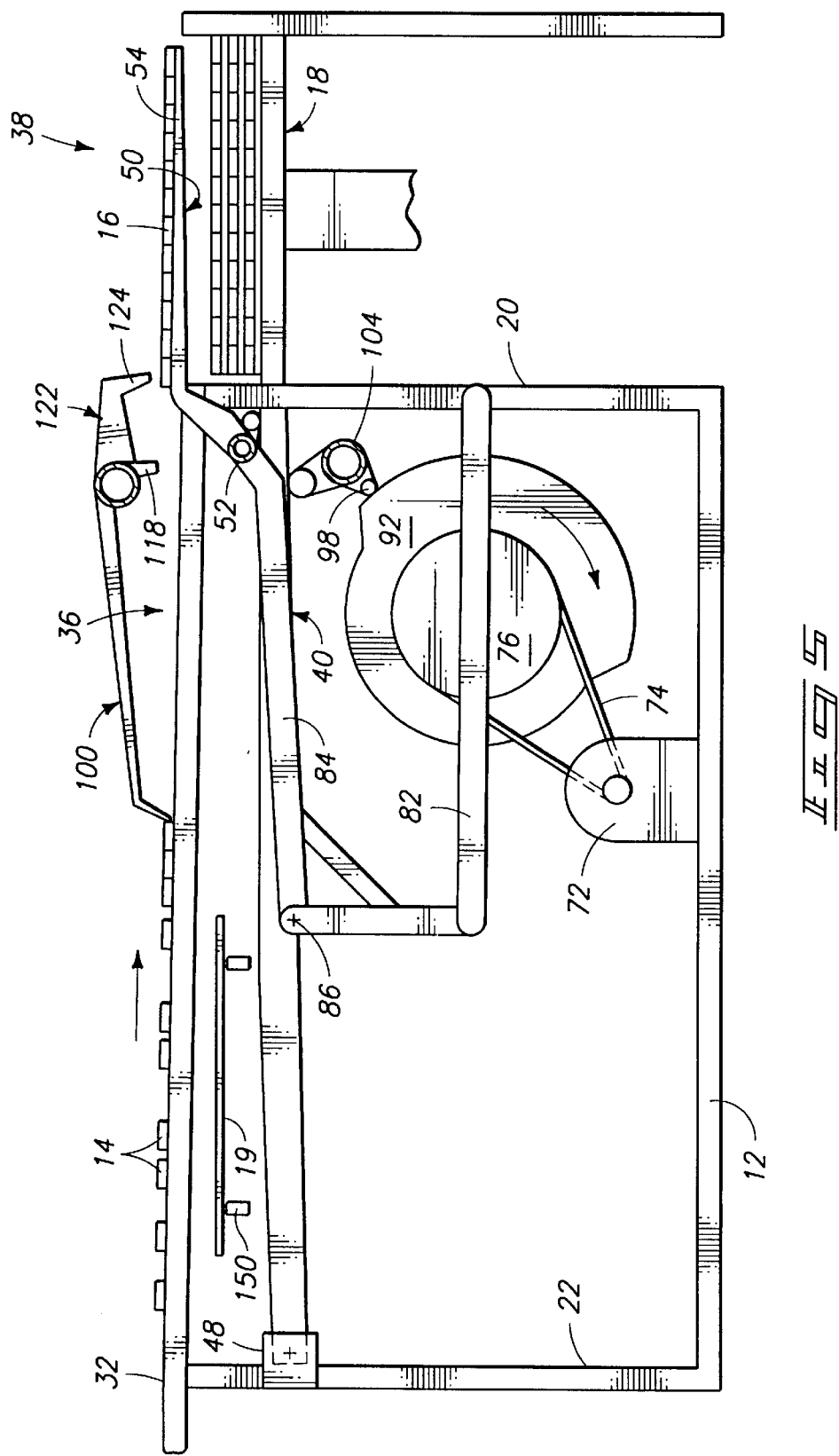
FIG. 5 is a vertical cross-sectional view similar to FIG. 4 except showing the arm structure moved from the layer pickup station to a layer stacking station.
Figure 6:
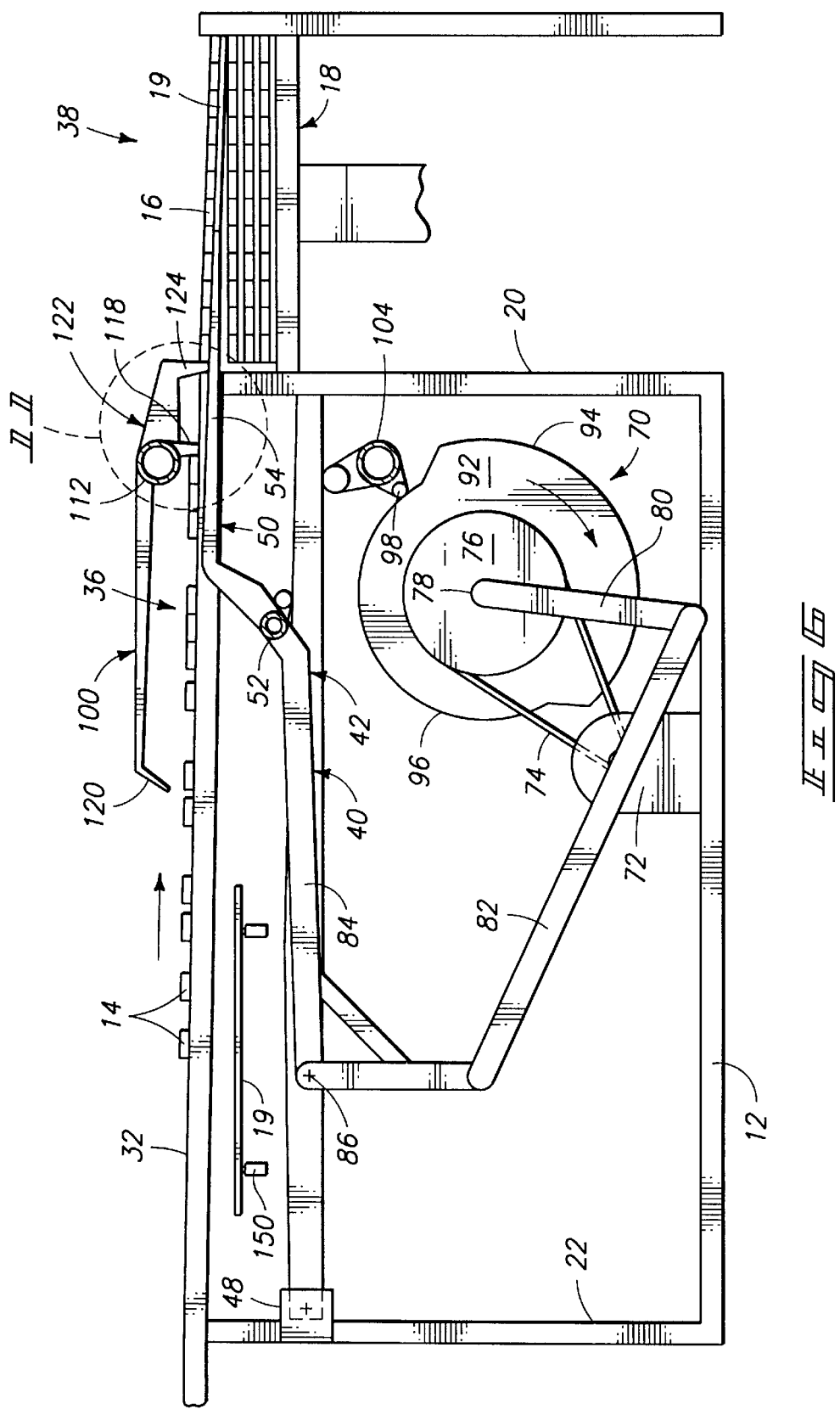
FIG. 6 is a vertical cross-sectional view similar to FIG. 5 except showing the arm structure moving rearward stripping the layer and stickers from the arm structure onto preceding layers to form a stack.
Figure 7:
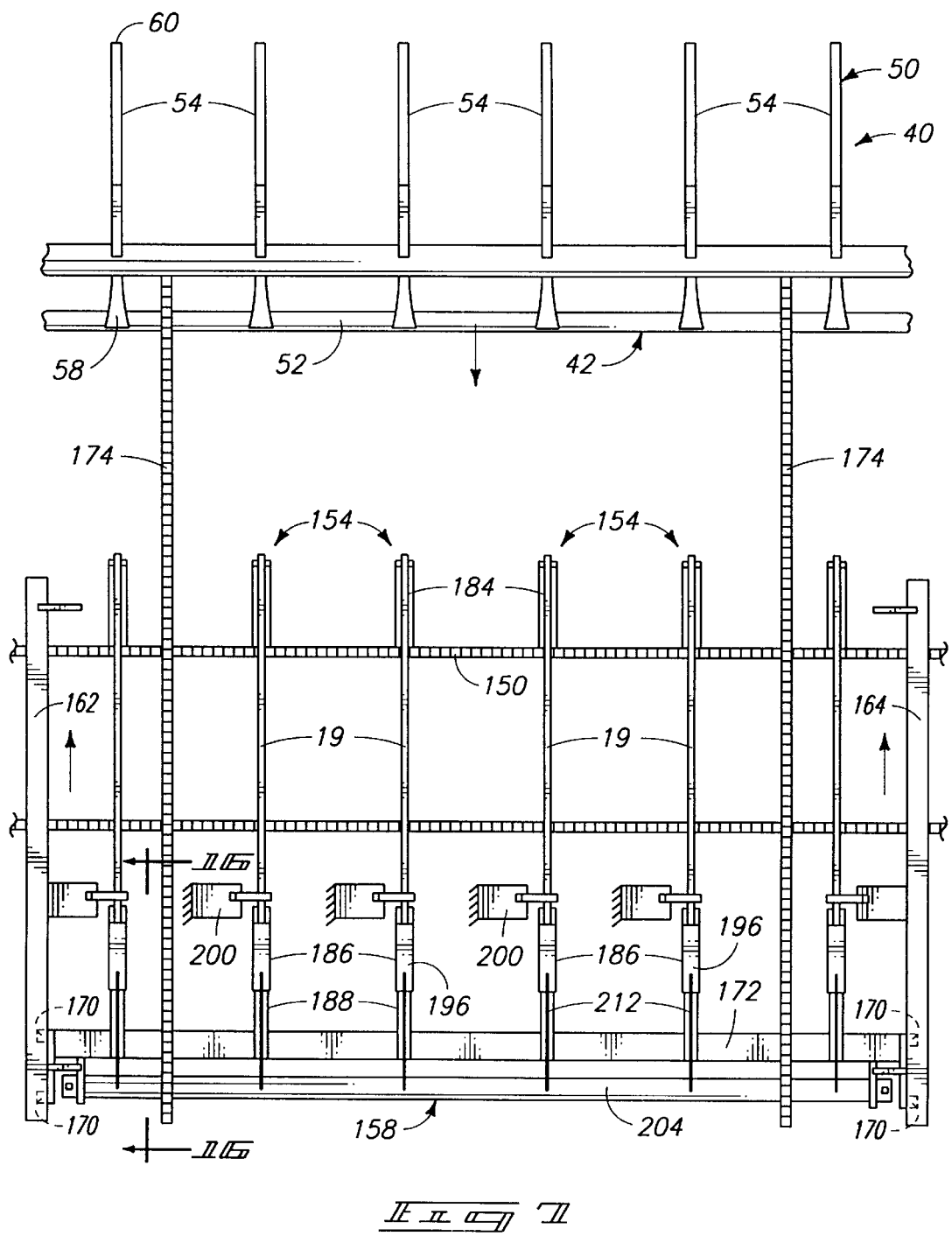
FIG. 7 is a fragmentary plan view with much of the detail removed to emphasize the arm structure in relation to a sticker transfer conveyor for removing stickers from a sticker feeding conveyor.

The apparatus 10 has a layer handling means 40 for (1) moving upward at the layer pickup station to remove a layer 16 of boards 14 from the layer support surface 32 as illustrated in FIG. 4, (2) moving the removed layer 16 forward from the pickup station 36 to the layer stacking station 38 as illustrated in FIG. 5, (3) moving downward to deposit the removed layer at the layer stacking station 38 superimposing the layer 16 on preceding layers 16 to form a stack as illustrated in FIG. 6, and (4) returning from the layer stacking station 38 to the layer pickup station 36 in preparation for picking up a succeeding layer 16. The process is generally repeated until the desired number of layers 16 are placed on the stack 18.

The preferred form of the layer handling means 40 includes a layer handling carriage 42 that is movably mounted on rails 44 and 46 for forward and back movement. The rails 44 and 46 are in turn pivotally mounted at their rear ends to pivot bearings 48 to enable the forward ends of the rails 44 and 46 to pivot up and down to raise and lower the carriage 42 as shown in FIGS. 4–6.

The carriage 42 comprises an arm structure 50 having a structural cross-member or tube 52 and a plurality of lifting arms 54 that extend upward and forward from the cross-member 52 in a cantilevered fashion for engaging a layer 16 as illustrated in FIGS. 4–6. Wheels 56 are mounted to the cross-member 52 for riding on the rails 44 and 46 to enable the arm structure 50 to move forward and rearward on the rails 44 and 46.

Figure 8:
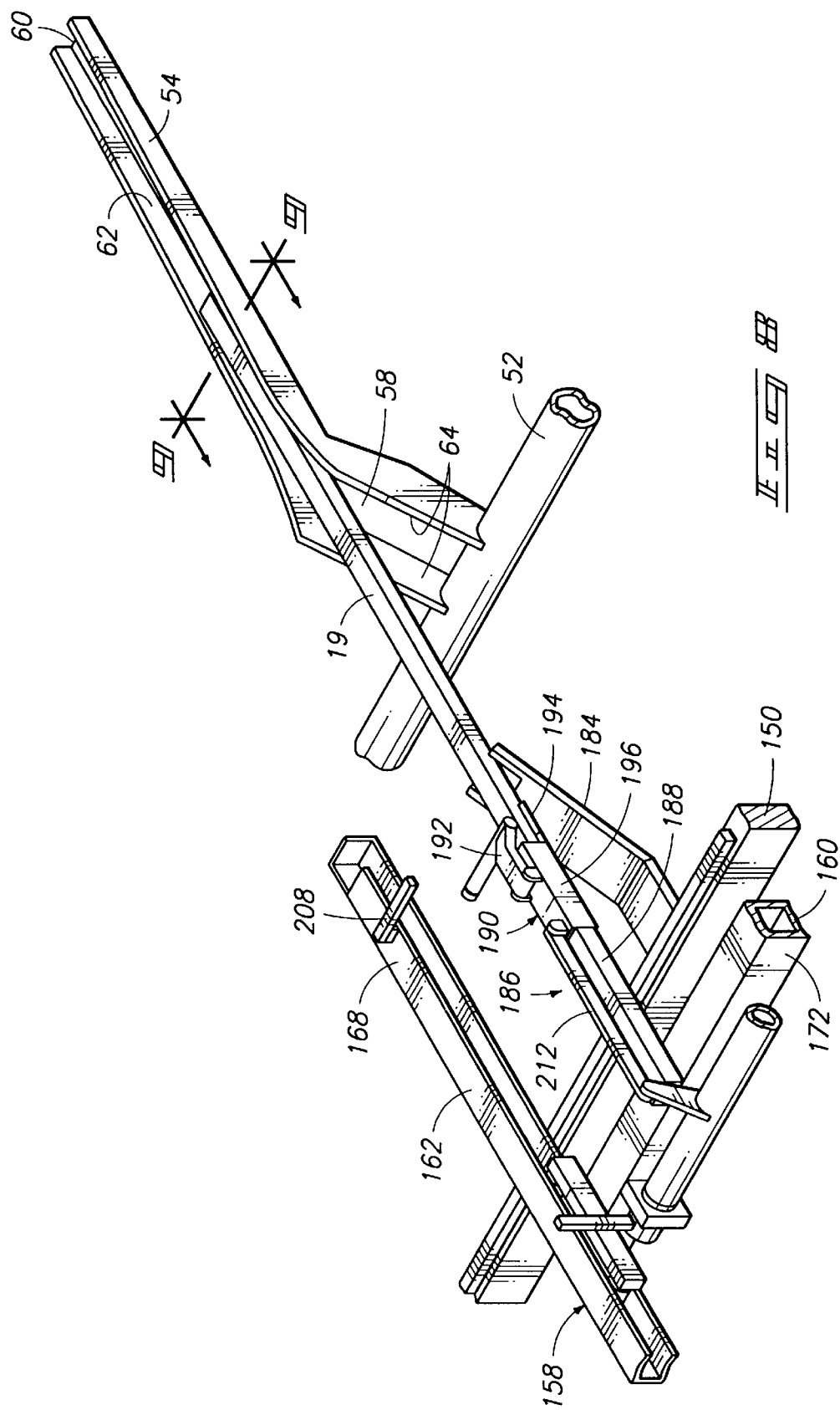
FIG. 8 is an isometric fragmentary view of a portion of the arm structure and a portion of the sticker transfer conveyor showing a sticker being loaded onto an arm.
Figure 9:
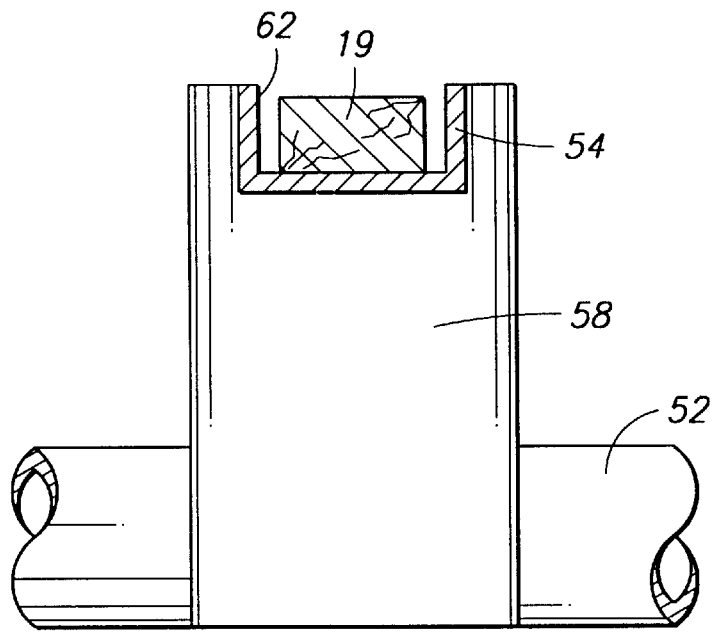
FIG. 9 is a vertical cross-sectional view taken along line 9—9 in FIG. 8.
Figure 10:
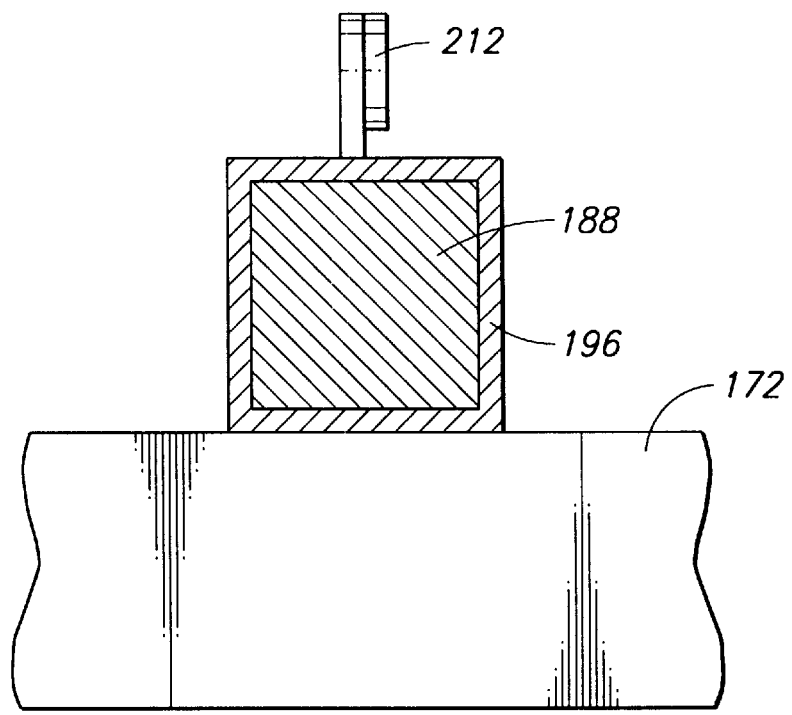
FIG. 10 is a vertical cross-sectional view taken along line 10—10 in FIG. 16.

Each of the lifting arms 54 is elongated extending from a base 58 at the cross-member 52 forward to a tip 60 (FIG. 8). The length of the arms 54 is generally slightly greater than the width of the stack 18. Each arm 54 has a U-shaped vertical transverse cross-section as illustrated in FIG. 9 forming a sticker slot 62 to receive a sticker. The slot 62 has an inclined entrance adjacent the base 58 defined by inclined sticker guide surfaces 64 that direct the front end of the sticker into the slot 62. The tip 60 has a sticker exit enabling a sticker to slide forward through the slot 62 and onto the stack 18.

Figure 2:
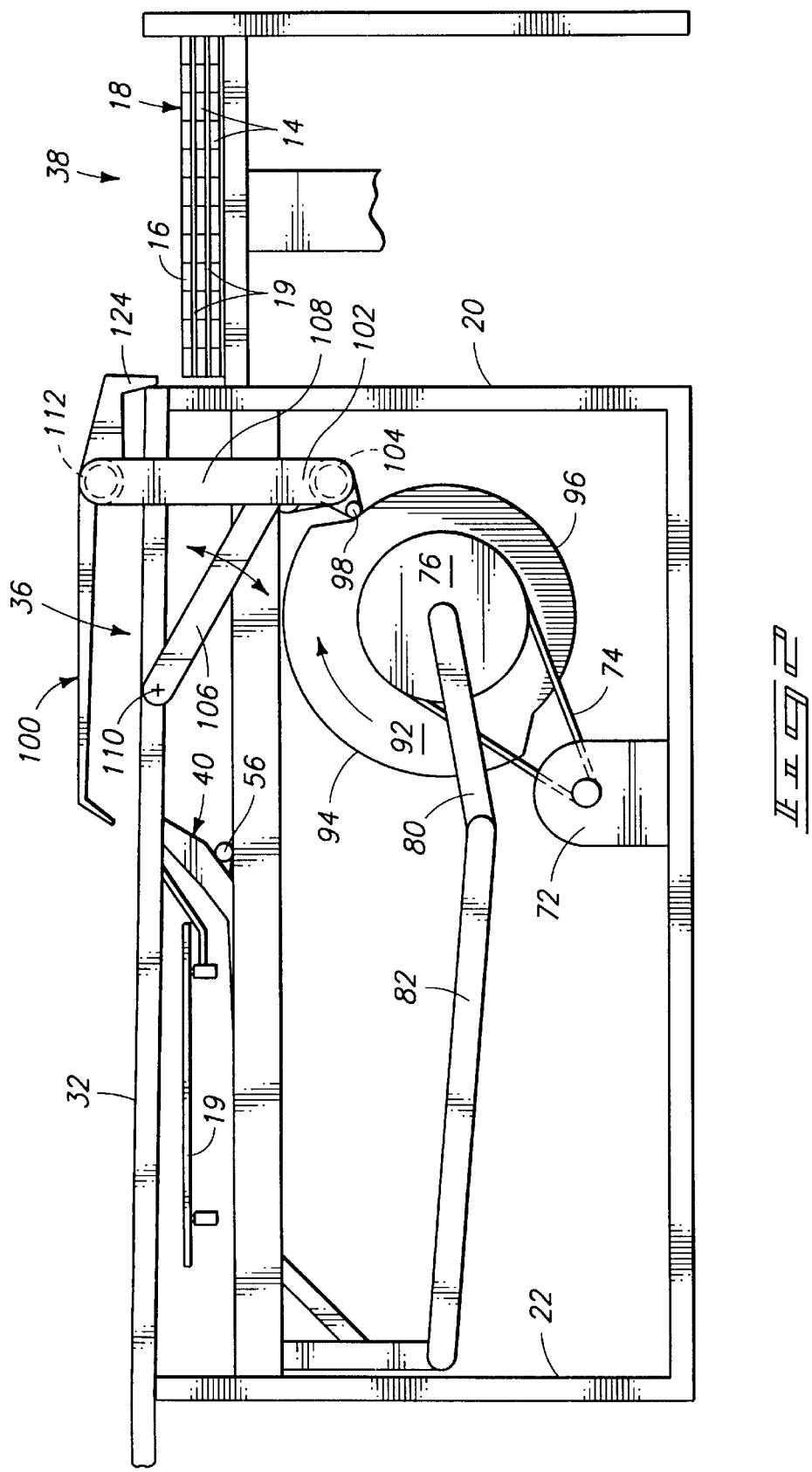
FIG. 2 is a right side view of the lumber stacking apparatus shown in FIG. 1.
Figure 3:
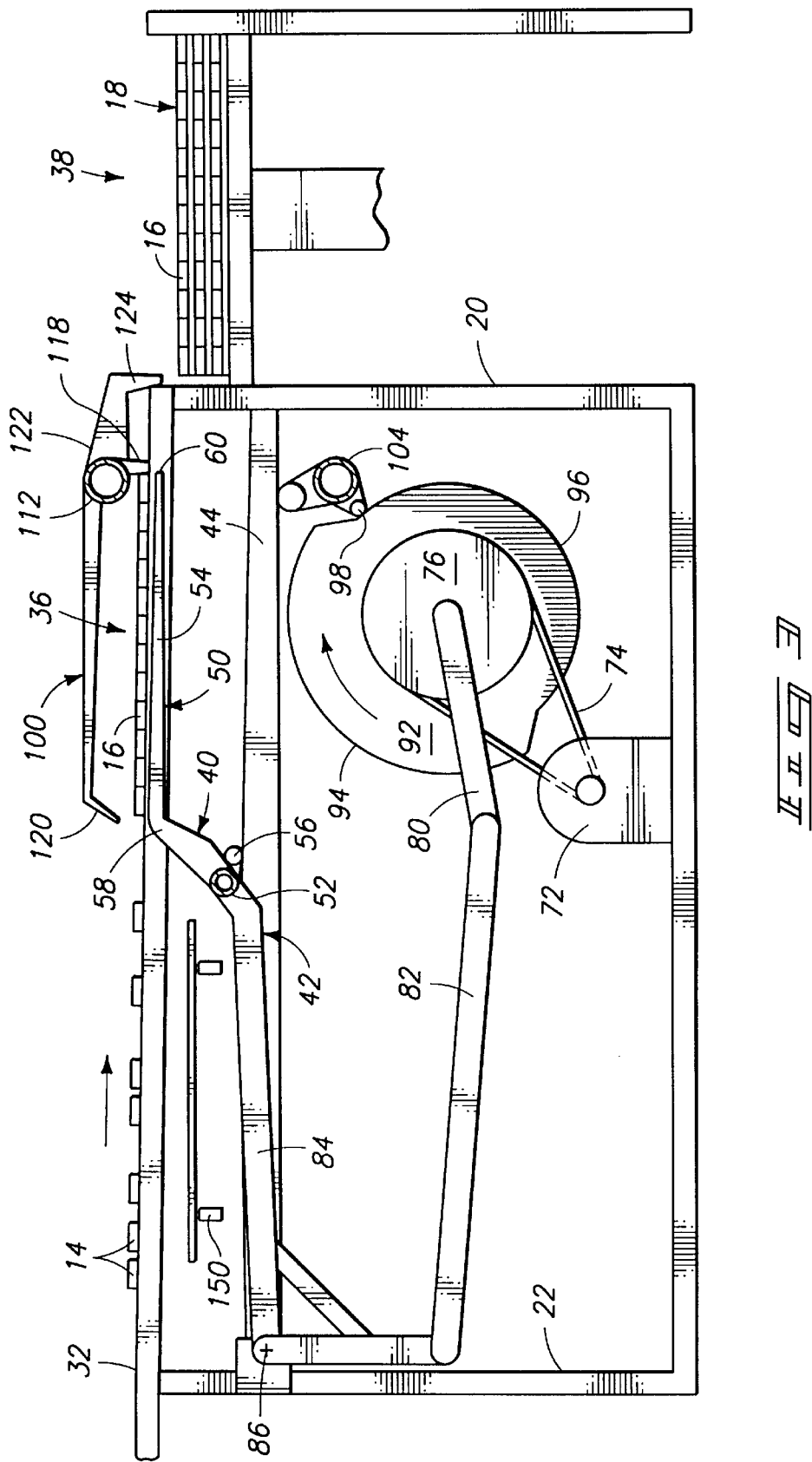
FIG. 3 is a vertical cross-sectional view taken along 3—3 in FIG. 1 showing a layer of boards on an elevated support surface and an arm support structure at a layer pickup station below the elevated support surface.

The apparatus 10 has a drive assembly 70 operatively connected to the layer handling means 40 for lifting and lowering the rails 44 and 46 and moving the arm structure forward and back (FIGS. 3–5). The drive assembly 70 includes a motor 72 that rotates a shaft 78 through a drive chain 74 and a sprocket 76 (FIG. 2). Crank arms 80 are attached to the shaft 78 and to connecting levers 82. The connecting levers 82 are in turn connected to rear ends of carriage drive arms 84. The outer ends of the connecting levers 82 are attached to rollers 86 that ride in substantially horizontal tracks 88 to confine the movement of the outer ends to a substantially horizontal forward and back movement.

The drive assembly 70 further includes a vertical oriented cam 92 mounted on the shaft 78 having a cam lobe section 94 and a cam dwell section 96 that rotate about the axis of the shaft 78. A cam follower 98 rides on the cam 92 for controlling a layer formation assembly 100.

The layer formation assembly 100 includes a pivot sub-frame 102 that has an internal cross member 104 extending between the sides 24 and 26 at the layer pickup station 36 below the layer support surface 32 and adjacent the front 20. The internal cross-member 104 is pivotally mounted to the sides 24 and 26 by pivot lever members 106 for pivotal movement about pivot axis 110 (FIG. 2). Side members 108 extend upward from cross member 104 alongside the sides 24 and 26 supporting an overhead frame member 112. The overhead frame member 112 extends between the sides 24 and 26 at the layer pickup station 36 elevated above the layer support surface and adjacent the front 20.

Layer formation stops 118 are mounted to the overhead frame member 112 at desired locations for vertical pivotal movement with the overhead frame member 112 into the path of the boards on the layer support surface 32 to selectively form layers 16 thereon as illustrated in FIGS. 3–6. Upstream board stops 120 are likewise mounted to the overhead frame member 112 at desired locations and project a substantial distance rearward for vertical pivotal or rocking movement with the overhead frame member 112 to project into the path of the boards 14 to temporarily stop the progression of the boards to the layer pickup station 36 during the period of the cycle in which the formed layer 16 is being moved from the layer pickup station 36 to the layer stacking station 38 (FIGS. 4 and 5). The vertical pivotal movement of the overhead frame member 112 and the associated movements of the layer formation stops 118 and the upstream stops 120 are controlled by the cam 92 and the cam follower 98. When the cam follower 98 rides on the cam dwell section 96, the overhead frame member 112 is lowered with the layer formation stops 118 projecting into the path of the boards 14 to cause the boards to backup behind the stops 118 to form the layers 16. When the cam follower 98 rides on the cam lobe section 94, the overhead frame member 112 is elevated with the layer formation stops 118 moving out of the path of the boards to permit the arm structure 50 to move the formed layer 16 from the layer pickup station 36 to the layer stacking station 38. Likewise the elevation of the overhead frame member 112 rocks the outer ends of the upstream board stops 120 into the path of the boards 14 to temporarily stop their progression.

A layer stripping mechanism 122 is associated with the layer formation assembly 100 for stripping the layer 16 and stickers 19 from the arms 54 when the arm structure 50 is returned from the layer stacking station 38 to the layer pickup station 36.

Figure 11:
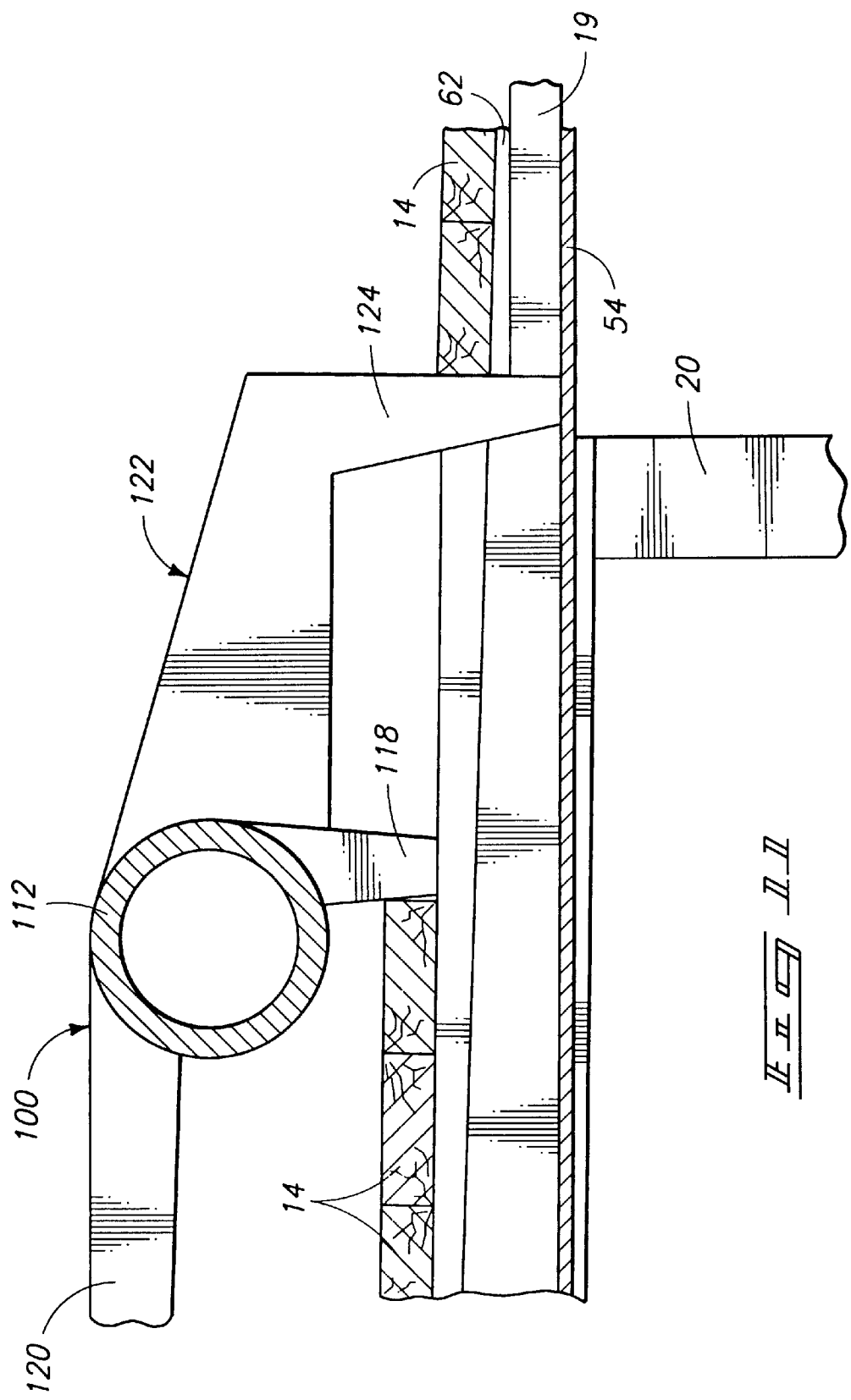
FIG. 11 is an enlarged fragmentary view taken with line 11 in FIG. 6.

In a preferred embodiment, stripping elements 124 are mounted on the overhead frame member 112 at intervals corresponding to the intervals between the arms 54 and project forward over the front 20 and in alignment with the slots 62 of the arms 54. As illustrated in FIGS. 6 and 11, the stripping elements 124 are lowered into the slots 62 after the arms 54 are over the layer stacking station 38 to strip both the layer and the stickers from the arms 54 when the arm structure 50 is retracted. Consequently the cam 92 and the cam follower 98 control both the layer formation assembly 100 and the stripping mechanism 122 in a very efficient coordinated manner.

The apparatus 10 includes a sticker feed conveyor 150 that receives stickers 19 from a source such as a sticker magazine 152 and distributes the stickers 19 along the back 22 of the frame 12 to a plurality of sticker stations 154 associated with the arms 54. Preferably the sticker stations 154 are aligned with the arms 54 rearward of the layer pickup station 36. A stationary sticker guide 184 is attached to the sticker feed conveyor 150 that extends forward at each sticker station 154 for guiding the stickers 19 in a manner that will be discussed further on.

The previously mentioned U.S. Pat. No. 3,904,044 granted Sep. 9, 1975 to the applicant is incorporated herein for additional details concerning the structure and operation of the sticker feed conveyor 150 and other details of the apparatus 10.

A sticker transfer conveyor 158 is provided in association with the sticker stations 154 for removing the stickers 19 from the sticker feed conveyor 150 and transferring the stickers 19 to the arms 54 as the arm structure 50 is returning from the layer stacking station 38 to the layer pickup station 36.

The sticker transfer conveyor 158 has a carriage 160 that is supported for back and forth movement on a pair of parallel spaced tracks 162 and 164. As illustrated in FIGS. 16–20 each of the tracks 162, 164 has an initial inclined section 166 and a forward horizontal section 168. The inclined section 166 is adjacent the back 22 and the horizontal section 168 extends forward from the inclined section 168 to the layer pickup station 36. The carriage 160 is composed of a cross frame member 172 with track rollers 170 mounted at ends thereof that ride on the tracks 162, 164.

The carriage 160 is moved back and forth by continuous drive chains 174 (FIGS. 12–15 and 20), in synchronous opposition to the horizontal movement of the arm structure 50. When the arm structure 50 moves forward the carriage 160 moves rearward and when the arm structure 50 moves rearward, the carriage 160 moves forward. A lower flight 178 is attached by a bracket 182 to the arm structure 50 and an upper flight 176 is attached by a bracket 180 to the carriage 160 (FIG. 20). Although the continuous chain drive 174 is preferred, a separate drive may be utilized that is not directly connected to the arm structure 50 for moving the carriage 160 forward and back in timed opposite movement to the arm structure 50.

The sticker transfer conveyor 158 has a sticker gripper 186 (FIGS. 12–20) mounted on the cross-frame member 172 at each sticker station 154 for gripping a rear end of the sticker 19 at the sticker station 154 and lifting the sticker by its rear end from the sticker feed conveyor 150 and then moving the sticker longitudinally forward to the layer pickup station 36 and depositing the sticker in an aligned arm slot 62.

Each sticker gripper 186 has a forward projecting support rod 188, preferably of a square cross-section, that is affixed to the cross-frame member 172. A gripping element assembly 190 is slidably mounted on the support rod 188 for forward and back movement. The assembly 190 has a slide 196 with an upper gripping element 192 and a lower gripping element 194. When the carriage 160 is in its rear position, the upper gripping element 192 is biased upward by fixed cam element 200.

Each gripper 186 has a grip and release mechanism 202 for manipulating the assemblies 190 to grip, pickup and release the stickers 19. The mechanism 202 has a pivot shaft 204 pivotally mounted parallel alongside the cross-frame member 172 and extending between the sticker stations 154. An upright lever 206 is affixed to the shaft 204 at each sticker station 154 that is in turn connected to a lever 212 that extends to the slide 196 for moving the slide 196 forward and back on the support rod 188.

When the carriage 160 moves toward its rear position as illustrated in FIG. 16, the rearwardmost roller 170 moves up the inclined track section 166 causing grippers 186 to pivot downward adjacent the ends of succeeding stickers 19. Further rearward movement causes one of the levers 206 to engage a stop 208 affixed to, at least one of the tracks 162, 164 to pivot the engaged lever 206 forward moving the slide 196 forward to project the gripping elements 192 and 194 adjacent the ends of the stickers on the feed conveyor 150 in preparation to grip the stickers 19. When the carriage 160 moves to its forward position illustrated in FIG. 19, the lever 206 engages stop 210 to pivot the engaged lever 206 rearward moving the slide 196 rearward to release a sticker in an arm slot 62.

Figure 18:
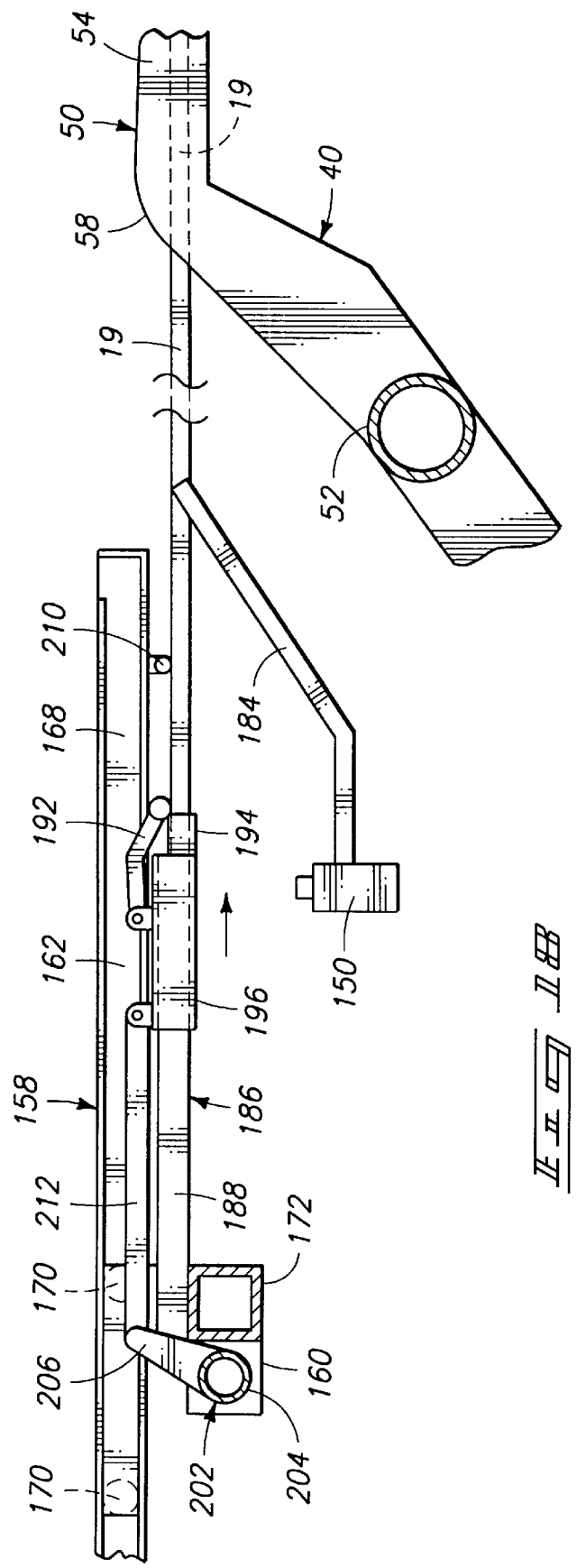
FIG. 18 is a fragmentary view similar to FIG. 17 except showing the sticker gripper moving the picked up sticker into the rear end of a slot of an arm.

As illustrated in FIGS. 12–20, the grippers 186 are initially at rear inclined positions with the rollers 170 in the inclined section 166 of the tracks 162, 164. The grippers 186 project downward with the upper and lower gripping elements 192 and 194 adjacent rear ends of stickers 19 at the sticker stations (FIGS. 12 and 16). At this stage the arm structure 50 is at the layer stacking station 38. As the carriage 160 moves forward, the grippers 186 move forward and upward in a pivoting motion to bring the lower gripping elements 194 underneath the rear ends of the stickers 19. The upper gripping elements 192 slide off the cam elements 200 and drop onto the upper side of the sticker 19 gripping the sticker end between the upper and lower gripping elements 192 and 194. Further movement of the carriage 160 along the horizontal section 168 of the tracks 162, 164 lifts the gripped stickers by their rear ends and moves the stickers forward (FIGS. 13 and 18). The forward ends of the stickers 19 are kept in general longitudinal alignment by the stationary sticker guides 184. As the front of the stickers 19 approach the rear of the arms 54, the sticker guide surfaces 64 guide the front of the stickers 19 into the sticker slots 62 (FIG. 14). At the forward end of the stroke of the carriage 160, one or more of the levers 206 engages the stop 208 causing the levers 206 to pivot rearward to pull the slide 196 rearward to strip the upper and lower gripping elements 192 and 194 from the rear ends of the stickers with the end of the rod 188 engaging the end of the sticker (FIG. 19). Thus a full complement of stickers 19 is loaded onto the arm structure 50 as the arm structure 50 returns to the layer pickup station.

It should be noted that in this embodiment, there is a single drive shaft 78 for rotating the crank arm 80 and rotating the cam 92. The cam 92 controls the vertical movement of the arm structure 50 and the operation of the layer formation assembly 100 and the stripping mechanism 122.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents

I claim:

1. A lumber stacking apparatus for forming a stack of boards having a plurality of superimposed layers of elongated boards, in which selected layers are separated by stickers that are oriented transversely to the elongated boards at desired sticker intervals along the length of the boards, said apparatus comprising:

a frame extending from a plurality of transversely spaced sticker pickup stations remote from the stack to a layer pickup station adjacent the stack;

an elevated layer support surface supported on the frame at the layer pickup station for successively supporting layers of elongated boards thereon;

an arm structure movably mounted on the frame for sequentially (1) moving upward at the layer pickup station to remove a layer of boards from the layer support surface; (2) moving the removed layer forward from the pickup station to a layer stacking station; (3)

moving downward to deposit the removed layer at the layer stacking station superimposed on a preceding layer to form the stack; and (4) moving rearward from the layer stacking station to the layer pickup station in preparation for picking up a succeeding layer;

an elongated sticker feeding conveyor extending transversely along the rearward portion of the frame between the spaced sticker stations corresponding to the desired sticker intervals for receiving a plurality of stickers and distributing the stickers individually to the spaced sticker stations;

a sticker transfer conveyor at the spaced sticker stations for removing the stickers from the sticker feeding conveyor at the spaced sticker stations and moving the stickers forward lengthwise from the sticker stations to the layer pickup station, beneath the elevated layer support surface and loading the stickers on the arm structure; and a drive mechanism operatively connected to the arm structure and to the sticker transfer conveyor for removing the stickers from the sticker stations and progressively loading the succeeding stickers on the arm structure beneath the elevated layer support surface as the arm structure is depositing the preceding board layer and moving rearward from the layer stacking station to the layer pickup station to prepare the arm structure for picking up a succeeding layer of board.

2. The lumber stacking apparatus as defined in claim 1 wherein the sticker transfer conveyor has a gripper at each sticker station for gripping a rear end of the sticker at the sticker station and picking up the sticker and moving the sticker forward from the sticker station to the arm structure and loading the sticker on the arm structure by releasing the rear end of the sticker.

3. The lumber stacking apparatus as defined in claim 1 wherein the sticker transfer conveyor includes (1) a carriage mounted on the frame for movement forward and back between the sticker stations and the layer pickup station, (2) a plurality of sticker grippers for gripping rear ends of the stickers at the sticker stations, removing the stickers from the sticker feeding conveyor, carrying the stickers forward from the sticker stations to the layer pickup station and releasing the stickers on the arm structure when the carriage is at the layer pickup station.

4. The lumber stacking apparatus as defined in claim 3 wherein the arm structure has a plurality of elongated arms for picking up and carrying the successive layers of boards and wherein at least some of the arms have longitudinal slots formed therein for receiving the stickers.

5. The lumber stacking apparatus as defined in claim 4 wherein each of the slots has a rear sticker entrance and a front sticker exit.

6. The lumber stacking apparatus as defined in claim 5 wherein the arms having longitudinal sticker slots further comprises guide surfaces adjacent the rear slot entrances for guiding front ends of the stickers into the slots.

7. The lumber stacking apparatus as defined in claim 5 further comprising overhead stripper elements associated with the sticker slots for entering the slots and engaging the rear ends of the stickers as the arm structure is being moved rearward from the layer pickup station to strip the stickers from the arms.

8. The lumber stacking apparatus as defined in claim 3 wherein the carriage is operatively connected to the arm structure so that the carriage moves in a synchronous opposite direction to the forward and back movement of the arm structure.

9. The lumber stacking apparatus as defined in claim 3 wherein the sticker transfer conveyor has tracks extending from the rearward portion of the frame toward the forward portion of the frame and wherein the carriage is movably mounted on tracks for forward and back movement above the sticker feeding conveyor and wherein the grippers have clamping elements for gripping rear ends of the stickers as the stickers rest on the sticker feeding conveyor and for raising the stickers from the sticker feeding conveyor with forward ends of the stickers being unsupported and moving the stickers forward to the layer pickup station and releasing the stickers on the arm structure.

10. The lumber stacking apparatus as defined in claim 9 wherein the sticker transfer conveyor has pivot means for initially pivoting the gripping elements downward to pick up the stickers by their rear ends and then for pivoting the clamping elements upward to lift the stickers from the sticker feeding conveyor.

11. The lumber stacking apparatus as defined in claim 1 wherein the arm structure is reciprocally mounted on an arm support track that is in turn pivotally mounted to the frame and wherein the drive means includes a cam and cam follower associated with the arm support track for pivoting the arm support track upward to move the arm support structure upward at the layer pickup station to remove the layer from the elevated layer support surface and for pivoting the arm support track downward to move the arm support structure and supporting layer downward at the layer stacking station.

12. The lumber stacking apparatus as defined in claim 11 wherein the drive means includes a crank and lever mechanism operatively connected to the arm structure for moving the arm structure forward to move the removed layer forward from the pickup station to the layer stacking station and for moving the arm structure rearward from the layer stacking station to the layer pickup station.

13. The lumber stacking apparatus as defined in claim 1 wherein the drive means includes a crank and lever mechanism operatively connected to the arm structure for moving the arm structure forward to move the removed layer forward from the pickup station to the layer stacking station and for moving the arm structure rearward from the layer stacking station to the layer pickup station.

14. The lumber stacking apparatus as defined in claim 1 further comprising an overhead layer and sticker stripping mechanism mounted on the frame overlying the elevated layer support surface and having stripper elements that are vertically movable between an elevated non-stripping position out of the path of a layer of boards and stickers supported on the arm structure when the arm structure is moving forward from the layer pickup station to the layer stacking station and a lower stripping position into the path of the layer and stickers when the arm structure is moving rearward from the layer stacking station to the layer pickup station to strip the layer and stickers from the arm structure.

15. The lumber stacking apparatus as defined in claim 14 wherein the arm structure includes a plurality of elongated sticker slots formed to receive stickers and wherein the stripper elements when in the lower stripping position project into the sticker slots to strip the stickers from the arms when the arm structure is moved rearward.

16. The lumber stacking apparatus as defined in claim 1 further comprising an overhead layer formation mechanism mounted on the frame and overlying the elevated layer support surface and having (1) a set of movable layer formation stops at the layer pickup station for forming a layer of boards on the elevated layer support surface when the layer formation stops are in a down position and for releasing the formed layer when the layer formation stops are in an elevated position, and (2) a set of upstream board stops rearward of the layer formation stops for projecting into the path of the boards when the layer formation stops are in the elevated position to prevent boards from moving to the layer pickup station and for projecting out of the path of the boards when the layer formation stops are in the down position to permit the boards to move to the layer pickup station to form a layer.

* * * * *